(No Model.)

H. W. CORNELL.
CORN SHELLER.

No. 284,388. Patented Sept. 4, 1883.

WITNESSES
Edwin L. Jewell.
J. J. McCarthy

INVENTOR
Harmon W. Cornell
By C. N. Alexander
Attorney

N. PETERS, Photo-Lithographer, Washington, D. C.

UNITED STATES PATENT OFFICE.

HARMON W. CORNELL, OF OWEGO, NEW YORK.

CORN-SHELLER.

SPECIFICATION forming part of Letters Patent No. 284,388, dated September 4, 1883.

Application filed June 22, 1883. (No model.)

*To all whom it may concern:*

Be it known that I, HARMON W. CORNELL, a citizen of the United States, residing at Owego, in the county of Tioga and State of New York, have invented certain new and useful Improvements in Corn-Shellers, of which the following is a specification, reference being had therein to the accompanying drawings.

The object of my improvement is to get a more perfect action of an improved corn-sheller heretofore patented to me June 18, 1872, and numbered 128,124, by means of mechanism for the better government of the tension of the presser-bar upon the ears of corn as they pass through the machine. This result is obtained by the mechanism illustrated in the accompanying drawings, in which—

Figure 1:
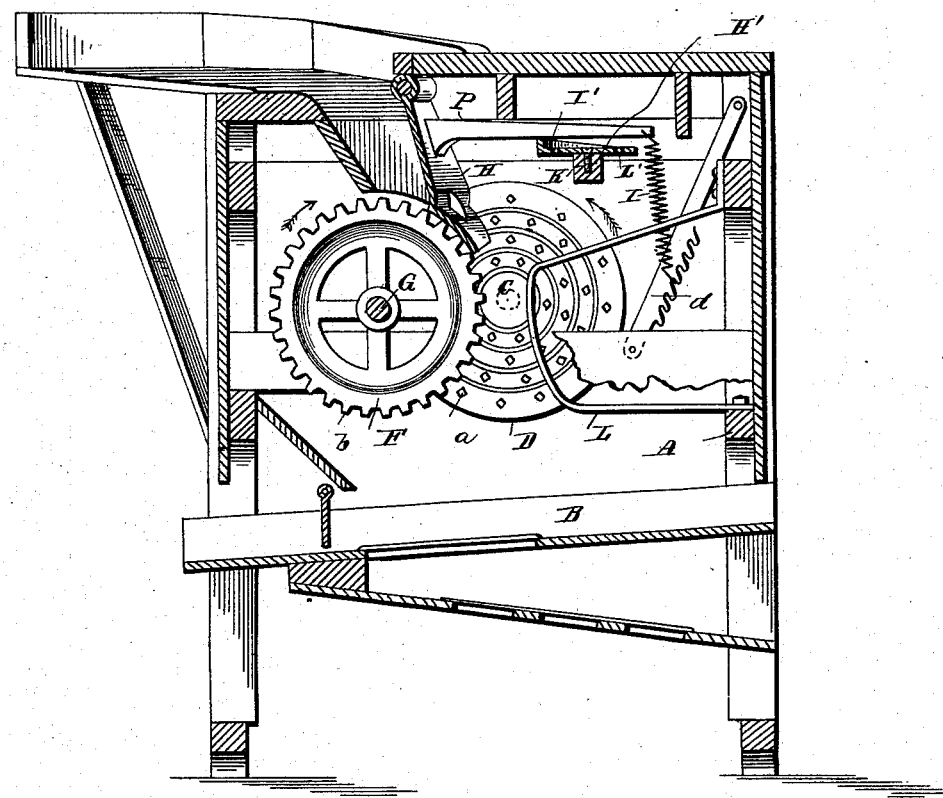
Figure 2:
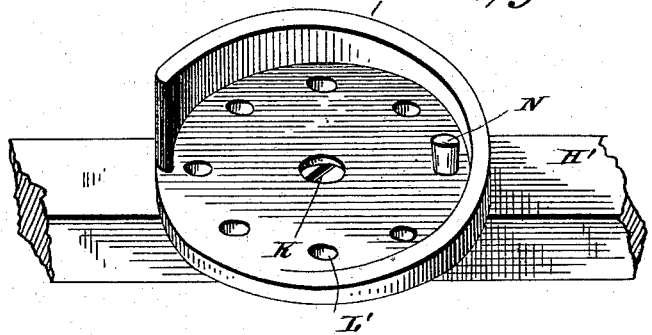

Figure 1 is a longitudinal vertical section of a corn-sheller embodying my invention. Fig. 2 is a detached perspective view, showing my improvement in detail.

The frame-work of the machine is referred to by the letter A. The lower portion of the machine is provided with the usual separator, B, for separating the chaff from the corn. This separator may be operated in any suitable manner from the gearing of the machine. Within the frame-work A is a circular disk, D, secured upon the end of shaft C. This disk is provided upon its inner face with teeth $a$, which are arranged in concentric circles, as shown.

F refers to a wheel secured upon a shaft, G, and having its rim beveled or inclined toward the disk D. Upon this rim are equidistant ribs or elongated teeth $b$. In the angle between the wheel F and the disk D works the angular presser-bar H, having a spring, I, connecting with its projecting arm P. The tension of this spring is regulated by means of notched bar $d$.

In Fig. 2 my improvement is specially illustrated. H' refers to a beam forming part of the frame A. To the beam H' is swiveled a cam-plate, I', as shown at K. This cam-plate is provided with a number of apertures, L', corresponding to an aperture in the beam H', for the purpose of locking the cam-plate in position by the insertion of the lock-pin N through the aperture of the cam-plate into the aperture of the beam H', as shown in Fig. 2.

It will be seen that by means of the spring I, attached to notched bar $d$, and connecting with presser-bar H at the end of its projecting arm P, against which the cam-plate I' may be made to bear, as desired, the position and tension of the presser-bar H may be positively governed to suit the size of the ears of corn to be shelled.

The shafts C and G are connected and rotated in opposite directions by means of gearing, or in any other convenient manner that will make them run at different speeds, as the wheel E must be run faster than the disk D. The shaft C, which carries the disk D, must be more or less elevated above the shaft G in order to get the desired draft for running the ears of corn through the sheller.

The letter L, Fig. 1, refers to a guard attached to the end of the frame and extending in front of the disk to a suitable position opposite the periphery and beveled surface of the wheel F, in order to hold the cobs in position after they pass from under the presser-bar H.

Having thus fully described and explained the construction and operation of my improvement, what I claim as new, and desire to secure by Letters Patent, is—

The combination of the presser-bar H P, the cam-plate I', swiveled to the beam H', and provided with a series of apertures, L', the lock-pin N, and beam H', provided with an aperture, whereby the cam-plate may be adjusted and the tension on the presser-bar regulated, substantially as specified.

In testimony whereof I affix my signature in presence of two witnesses.

HARMON W. CORNELL.

Witnesses:
H. CORYDON BROWN,
J. J. VAN KLEECK.